United States Patent
Ohyama et al.

(10) Patent No.: US 9,087,477 B2
(45) Date of Patent: Jul. 21, 2015

(54) DISPLAY APPARATUS AND ELECTRONIC APPARATUS

(71) Applicant: Japan Display West, Inc., Aichi-Ken (JP)

(72) Inventors: Tsuyoshi Ohyama, Tokyo (JP); Yingbao Yang, Kanagawa (JP); Ryoichi Tsuzaki, Kanagawa (JP)

(73) Assignee: Japan Display Inc., Tokyo (JP)

( * ) Notice: Subject to any disclaimer, the term of this patent is extended or adjusted under 35 U.S.C. 154(b) by 200 days.

(21) Appl. No.: 13/768,425

(22) Filed: Feb. 15, 2013

(65) Prior Publication Data

US 2013/0235005 A1 Sep. 12, 2013

(30) Foreign Application Priority Data

Mar. 7, 2012 (JP) ................................. 2012-049964

(51) Int. Cl.
*G09G 5/14* (2006.01)
*H04N 13/04* (2006.01)

(52) U.S. Cl.
CPC .............. *G09G 5/14* (2013.01); *H04N 13/0409* (2013.01); *H04N 13/0477* (2013.01); *H04N 13/0479* (2013.01)

(58) Field of Classification Search
CPC ........... G09G 3/00; G09G 5/006; G09G 5/14; G06T 15/00; G02B 27/2214; H04N 13/0409
USPC ........... 345/6, 204, 214, 419; 349/15; 348/51, 348/54–56, E13.001
See application file for complete search history.

(56) References Cited

U.S. PATENT DOCUMENTS

| | | | |
|---|---|---|---|
| 6,008,484 A * | 12/1999 | Woodgate et al. | 250/201.1 |
| 6,377,295 B1 * | 4/2002 | Woodgate et al. | 348/59 |
| 8,228,370 B2 * | 7/2012 | Namii et al. | 348/46 |
| 8,581,966 B2 * | 11/2013 | Chen et al. | 348/51 |
| 2004/0001139 A1 * | 1/2004 | Kobayashi | 348/59 |
| 2005/0083400 A1 * | 4/2005 | Hirayama et al. | 348/14.07 |
| 2006/0170674 A1 * | 8/2006 | Tsubaki et al. | 345/419 |
| 2007/0171276 A1 * | 7/2007 | Kim et al. | 348/51 |
| 2008/0309663 A1 * | 12/2008 | Fukushima et al. | 345/419 |
| 2010/0060983 A1 * | 3/2010 | Wu et al. | 359/466 |
| 2010/0225743 A1 * | 9/2010 | Florencio et al. | 348/46 |

(Continued)

FOREIGN PATENT DOCUMENTS

| | | |
|---|---|---|
| EP | 2 663 081 A2 | 11/2013 |
| JP | 09-050019 | 2/1997 |

(Continued)

OTHER PUBLICATIONS

Japanese Office Action mailed Feb. 3, 2015 for corresponding Japanese Application No. 2012-049964.

*Primary Examiner* — Joe H Cheng
(74) *Attorney, Agent, or Firm* — Fishman Stewart Yamaguchi PLLC

(57) ABSTRACT

The present disclosure provides a display apparatus and an electronic apparatus wherein appropriate stereoscopic display can be carried out irrespective of the viewpoint position. The display apparatus includes a display section configured to have a plurality of pixels and display a plurality of viewpoint images allocated to different ones of the pixels; a detection section configured to detect an observation angle of an observer; and a display controlling section configured to change displaying positions of the viewpoint images at the pixels in response to the observation angle.

6 Claims, 13 Drawing Sheets

(56) References Cited

U.S. PATENT DOCUMENTS

| | | | |
|---|---|---|---|
| 2011/0043715 A1* | 2/2011 | Ohyama et al. | 349/15 |
| 2011/0051239 A1* | 3/2011 | Daiku | 359/464 |
| 2011/0096071 A1* | 4/2011 | Okamoto et al. | 345/419 |
| 2011/0102423 A1* | 5/2011 | Nam et al. | 345/419 |
| 2011/0122128 A1* | 5/2011 | Akita | 345/419 |
| 2011/0157697 A1* | 6/2011 | Bennett et al. | 359/462 |
| 2011/0285700 A1* | 11/2011 | Kim et al. | 345/419 |
| 2011/0316985 A1* | 12/2011 | Ishikawa et al. | 348/51 |
| 2012/0038635 A1* | 2/2012 | Stamate et al. | 345/419 |
| 2012/0044330 A1* | 2/2012 | Watanabe | 348/54 |
| 2012/0062556 A1* | 3/2012 | Yamamoto et al. | 345/419 |
| 2012/0236405 A1* | 9/2012 | Ohyama | 359/464 |
| 2014/0211112 A1* | 7/2014 | Yang et al. | 349/15 |

FOREIGN PATENT DOCUMENTS

| | | |
|---|---|---|
| JP | H09-160144 | 6/1997 |
| JP | H09-247713 | 9/1997 |
| JP | 2014509465 A | 4/2014 |

\* cited by examiner

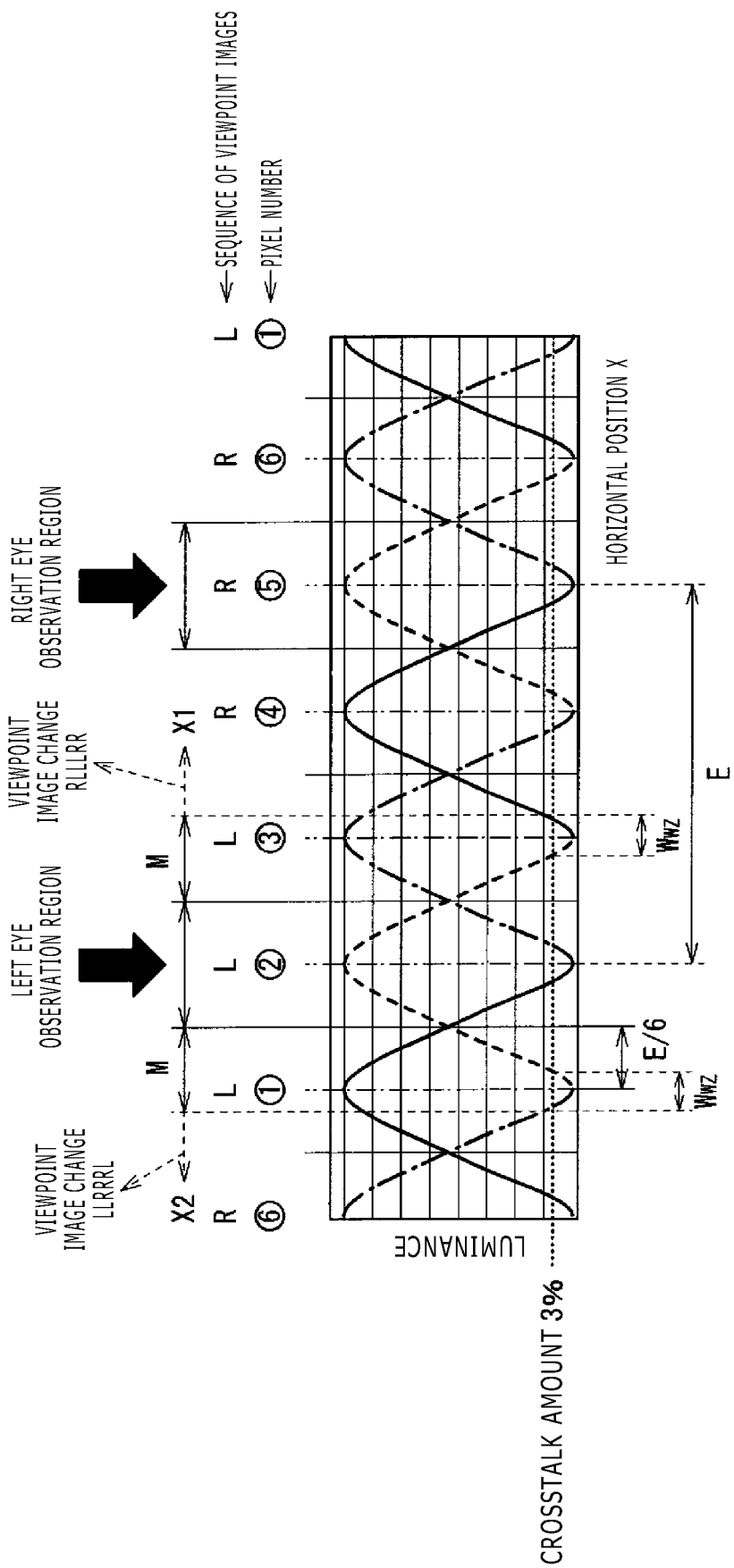

DISPLAY APPARATUS AND ELECTRONIC APPARATUS

BACKGROUND

The present disclosure relates to a display apparatus which uses a parallax element to carry out stereoscopic display by a naked eye method and an electronic apparatus which includes a display apparatus of the type described.

As a method for carrying out stereoscopic display, a glasses method wherein glasses for stereoscopic viewing are used and a naked eye method wherein stereoscopic viewing with naked eyes can be implemented without using special glasses for stereoscopic viewing are available. As a representative naked eye method, a parallax barrier method and a lenticular lens method are available. In the parallax barrier method and the lenticular lens method, a plurality of viewpoint images for stereoscopic viewing, in the case of two viewpoints, a viewpoint image for the right eye and a viewpoint image for the left eye, are displayed in a spatially divided state on a two-dimensional display panel. Then, the displayed viewpoint images are separated in a horizontal direction by a parallax element to achieve stereoscopic viewing. In the case of the parallax barrier method, a parallax barrier having slit-like openings formed thereon is used as the parallax element. In the case of the lenticular method, a lenticular lens having a plurality of cylindrical divisional lenses arranged in parallel to each other is used as the parallax element.

SUMMARY

However, the naked eye method which uses a parallax element has a subject that, if the viewpoint position of a viewer is displaced from a predetermined designed region, then normal stereoscopic viewing cannot be carried out. While Japanese Patent Laid-Open No. Hei 9-50019 discloses a display apparatus wherein the designed appropriate viewing distance can be reduced, normal stereoscopic viewing is lost outside the appropriate viewing distance.

Therefore, it is desirable to provide a display apparatus and an electronic apparatus wherein appropriate stereoscopic display can be obtained irrespective of the viewpoint position.

According to the present disclosure, there is provided a display apparatus including: a display section configured to have a plurality of pixels and display a plurality of viewpoint images allocated to different ones of the pixels; a detection section configured to detect an observation angle of an observer; and a display controlling section configured to change displaying positions of the viewpoint images at the pixels in response to the observation angle.

According to the present disclosure, there is provided an electronic apparatus which includes the display apparatus including: a display section configured to have a plurality of pixels and display a plurality of viewpoint images allocated to different ones of the pixels; a detection section configured to detect an observation angle of an observer; and a display controlling section configured to change displaying positions of the viewpoint images at the pixels in response to the observation angle.

In the display apparatus and the electronic apparatus, the displaying positions of viewpoint images at the pixels are varied in response to the observation angle.

Accordingly, with the display apparatus and the electronic apparatus, since the displaying positions of viewpoint images at the pixels are varied in response to the observation angle, appropriate stereoscopic display can be carried out irrespective of the viewpoint position.

BRIEF DESCRIPTION OF THE DRAWINGS

FIG. 12 is a diagrammatic view illustrating an example of a changeover margin in the case where the same viewpoint image is displayed at three pixels;

DETAILED DESCRIPTION OF THE PREFERRED EMBODIMENT

In the following, an embodiment of the present disclosure is described in detail with reference to the accompanying drawings. It is to be noted that the description is given in the following order.

Figure 1:
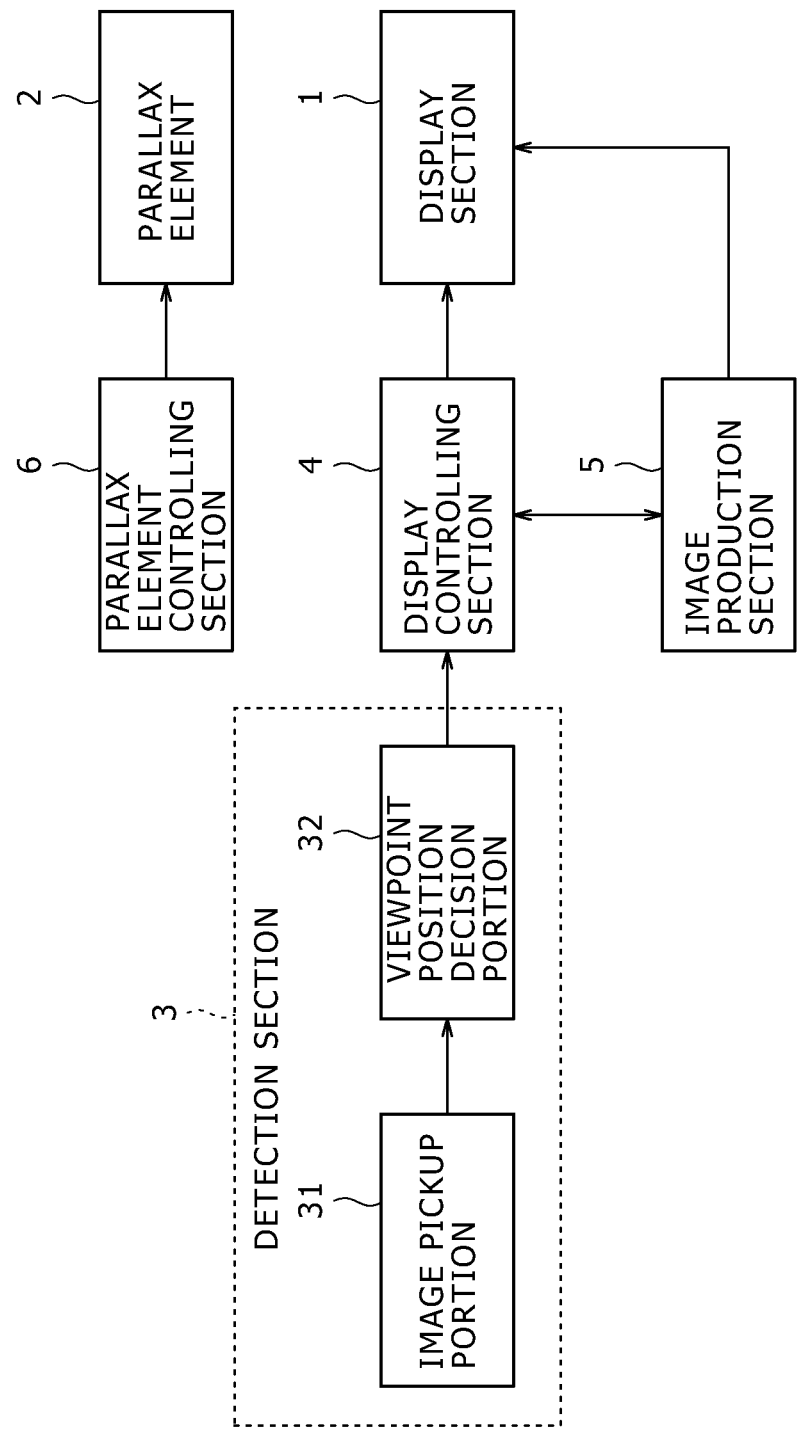
FIG. 1 is a block diagram showing an example of a configuration of a display apparatus according to an embodiment of the present disclosure.

1. Configuration of the Display Apparatus
2. Particular Example of Display Control of Viewpoint Images
3. Effect
4. Modification 1. Configuration of the Display Apparatus FIG. 1 shows an example of a configuration of a display apparatus according to an embodiment of the present disclosure. Referring to FIG. 1, the display apparatus includes a display section 1, a parallax element 2, a detection section 3, a display controlling section 4, an image production section 5 and a parallax element controlling section 6. The detection section 3 includes an image pickup portion 31 and a viewpoint position decision portion 32.

The display section 1 is configured from a two-dimensional display unit such as a liquid crystal display panel, a display panel of the electroluminescence type or a plasma display panel. A plurality of pixels are arrayed two-dimensionally on a display screen of the display section 1. On the display screen of the display section 1, an image is displayed in accordance with a stereoscopic display method of the present display apparatus. Plural ones of the pixels or sub-pixels of the display section 1 are numbered to 1 to n as hereinafter described where n is an integer equal to or greater than 4, and a plurality of viewpoint images are allocated to the pixels of the different numbers and displayed.

This display apparatus carries out stereoscopic display in accordance with the naked eye method. In this stereoscopic display method, the parallax element 2 of the parallax barrier type, the lenticular lens type or the like is used. A plurality of parallax images of different viewpoints, namely, a plurality of viewpoint images, are synthesized within one screen image so that a parallax synthesis image is displayed on the display section 1. In other words, a plurality of viewpoint images are displayed in a spatially divided state. In this display apparatus, display positions of different viewpoint images at different pixels are changed in response to the viewpoint position of the observer, particularly in response to an observation angle θ.

Figure 2:
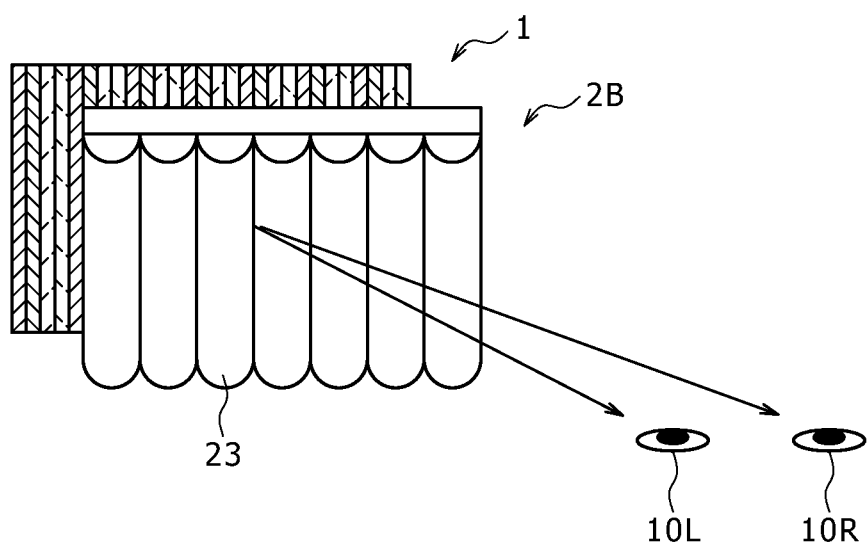
FIG. 2 is a schematic view showing an example of a configuration of a display apparatus of the lenticular type.

In the case of the lenticular method, for example, a lenticular lens 2B wherein a plurality of cylindrical divisional lenses 23 are disposed in parallel to each other is used as the parallax element 2. The lenticular lens 2B spatially separates a plurality of viewpoint images displayed on the display section 1 and emits the viewpoint images toward the observer side. Consequently, the different viewpoint images displayed on the display section 1 are separated in different directions from each other, and different viewpoint images arrive at the left eye 10L and the right eye 10R to allow stereoscopic viewing. It is to be noted that, while FIG. 2 shows an example wherein the lenticular lens 2B is disposed between the observer and the display section 1, the lenticular lens 2B may otherwise be disposed on the rear face side of the display section 1. The lenticular lens 2B may be a variable lens. Or, the lenticular lens 2B may be of the type wherein a lens effect can be electrically controlled between on and off, for example, like a liquid crystal lens. In this instance, the parallax element controlling section 6 electrically carries out the on-off control of the lens effect. In this instance, it is possible to selectively and arbitrarily change over between a two-dimensional (2D) display mode on the overall screen and a three-dimensional (3D) display mode on the overall screen. The changeover control between the two-dimensional display mode and the three-dimensional display mode can be carried out by changeover control of image data to be displayed on the display section 1 or changeover control of on-off operation of the lens effect by the parallax element 2. In this instance, a plurality of viewpoint images based on three-dimensional image data and images based on two-dimensional image data are arbitrarily and selectively displayed switchably on the display section 1. It is to be noted that the three-dimensional image data are data including a plurality of viewpoint images. For example, in the case where three-dimensional display of the binocular type is carried out, the three-dimensional data are data of viewpoint images for the right eye display and the left eye display.

Figure 3:
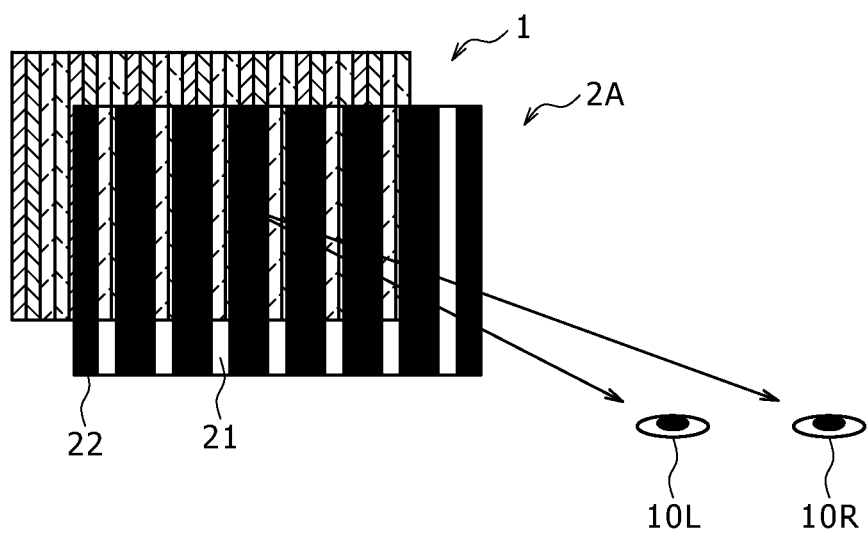
FIG. 3 is a schematic view showing an example of a configuration of a display apparatus of the parallax barrier type.

In the case of the parallax barrier method, a parallax barrier 2A is used as the parallax element 2 as shown in FIG. 3. Referring to FIG. 3, the parallax barrier 2A includes opening portions 21 through which light passes, and blocking portions 22 which intercept light. The parallax barrier 2A spatially separates a plurality of viewpoint images displayed on the display section 1 and emits the spatially separated viewpoint images to the observer side. Consequently, the viewpoint images displayed on the display section 1 are separated in different directions from each other such that viewpoint images different from each other arrive at the left eye 10L and the right eye 10R thereby to allow stereoscopic viewing. The parallax barrier 2A may be of the fixed type or of the variable type. In the case where the parallax barrier 2A is of the fixed type, a parallax barrier configured such that, for example, a pattern which serves as the opening portions 21 and the blocking portions 22 is formed from a metal member in the form of a thin film on the surface of transparent flat plates, namely, substrates, parallel to each other, can be used. In the case where the parallax barrier 2A is of the variable type, for example, a pattern of the opening portions 21 and the blocking portions 22 can be selectively formed using a displaying function, namely, a light modulation function, by a liquid crystal display element of the backlight type. In this instance, by electrically controlling the pattern of the parallax barrier 2A, the parallax element controlling section 6 can arbitrarily and selectively change over between a two-dimensional (2D) display mode over the overall screen and a three-dimensional (3D) display mode over the overall screen similarly as in the case where a variable lens is used as the lenticular lens 2B described above.

Figure 4:
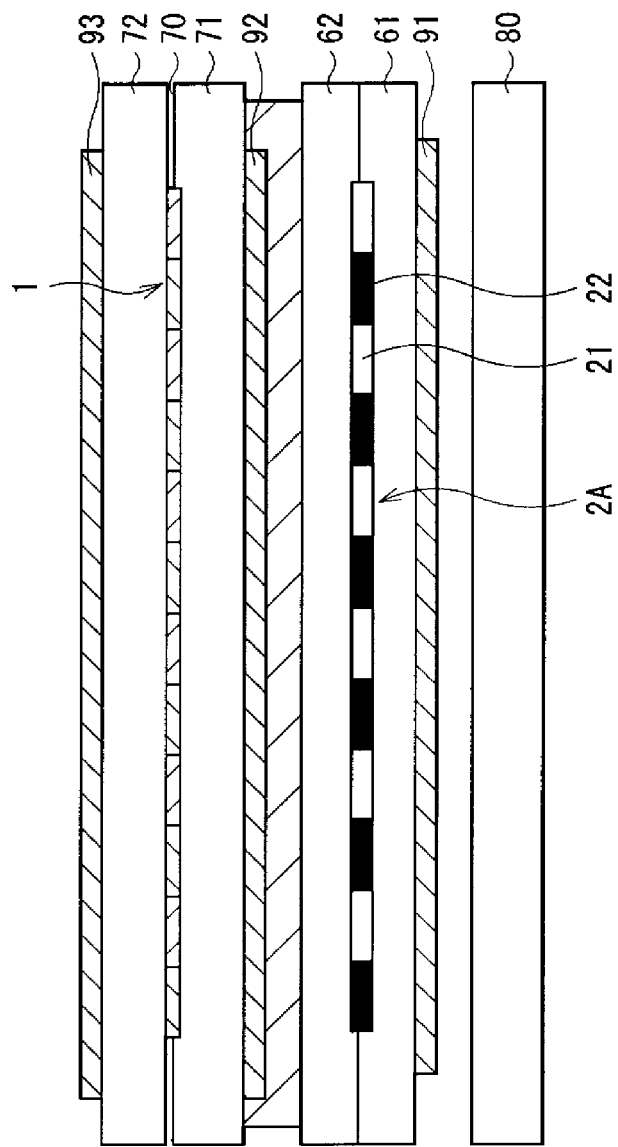
FIG. 4 is a schematic sectional view showing a particular example of a display section and a parallax element of the display apparatus of FIG. 1.

It is to be noted that, while FIG. 3 shows an example wherein the parallax barrier 2A is disposed on the display face side of the display section 1, another configuration wherein the parallax barrier 2A is disposed on the rear face side of the display section 1 may be adopted. For example, in the case where a liquid crystal display panel of the backlight type is used as the display section 1, the parallax barrier 2A may be disposed between the backlight and the liquid crystal display panel on the rear face side of the liquid crystal display panel. FIG. 4 shows such a configuration example as just described.

Referring to FIG. 4, in the configuration example shown, the parallax barrier 2A as the parallax element 2 is formed between a first transparent substrate 61 and a second transparent substrate 62. Further, the display section 1 having a liquid crystal layer 70 is formed between a first transparent substrate 71 and a second transparent substrate 72. In the present configuration example, the display section 1 is a liquid crystal display panel of the backlight type, and a backlight 80 is disposed on the rear face side of the first transparent substrate 61. In the present configuration example, the parallax barrier 2A is a parallax barrier element of the transmission variable type which uses, for example, a liquid crystal element, and the opening portions 21 and the blocking portions 22 can be formed at an arbitrary position. A first polarizing plate 91 is disposed between the first transparent substrate 61 and the backlight 80. A second polarizing plate 92 is disposed between the second transparent substrate 62 and the first transparent substrate 71. A third polarizing plate 93 is disposed on the front face side of the second transparent substrate 72.

The image pickup portion 31 picks up an image of the observer. The viewpoint position decision portion 32 analyzes an image picked up by the image pickup portion 31 to decide a viewpoint position of the observer, particularly, the observation angle θ. For the detection of the viewpoint position by the detection section 3, for example, a face tracking technique can be used. It is to be noted that the observation angle θ is, for example, an angle in the horizontal direction of the observer with respect to a predetermined portion, for example, a central portion, of the parallax element 2.

The display controlling section 4 controls an image to be displayed on the display section 1 in response to the observation angle θ of the observer detected by the detection section 3. The display controlling section 4 controls the display state of a plurality of viewpoint images to be displayed on the display section 1 so that reverse vision or crosstalk may not occur.

The image production section 5 produces image data including a plurality of viewpoint images in accordance with the viewpoint position of the observer and supplies the produced image data to the display section 1 under the control of the display controlling section 4. The display controlling section 4 controls the display section 1 to display the image data produced by the image production section 5.

2. Particular Example of Display Control of Viewpoint Images

In the following, display control in the case where a plurality of viewpoint images are configured from a left eye viewpoint image L and a right eye viewpoint image R is described.

The display controlling section 4 controls n (n is an integer equal to or greater than 4) pixels disposed at successive positions to display n/2 left eye viewpoint images L and n/2 right eye viewpoint images R and varies the display positions of the n/2 left eye viewpoint images L and the n/2 right eye viewpoint images R among the n pixels in response to the observation angle θ.

Figure 5:
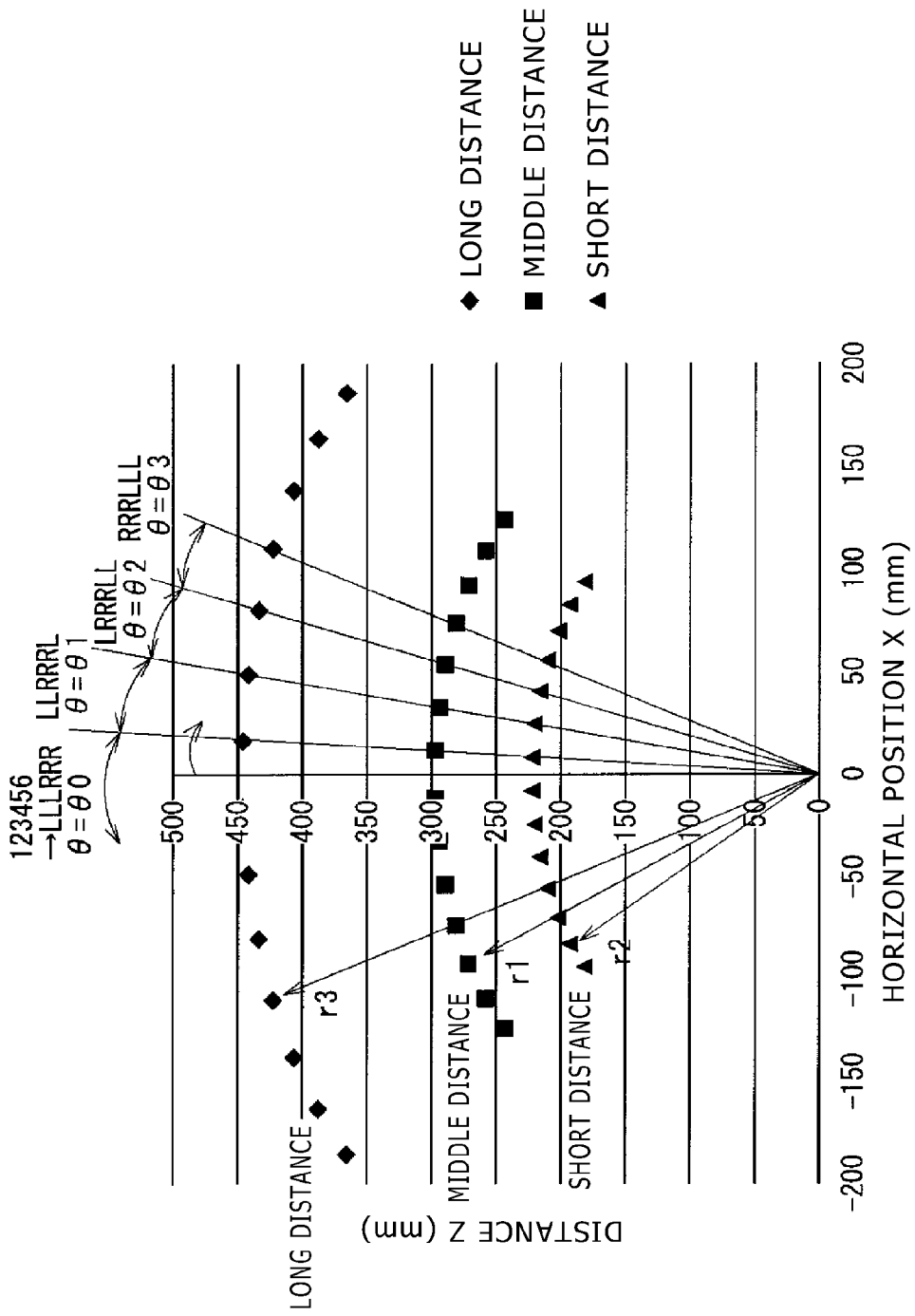
FIG. 5 is a diagrammatic view illustrating a relationship between a viewpoint position and a displayed position of a viewpoint image.
Figure 6:
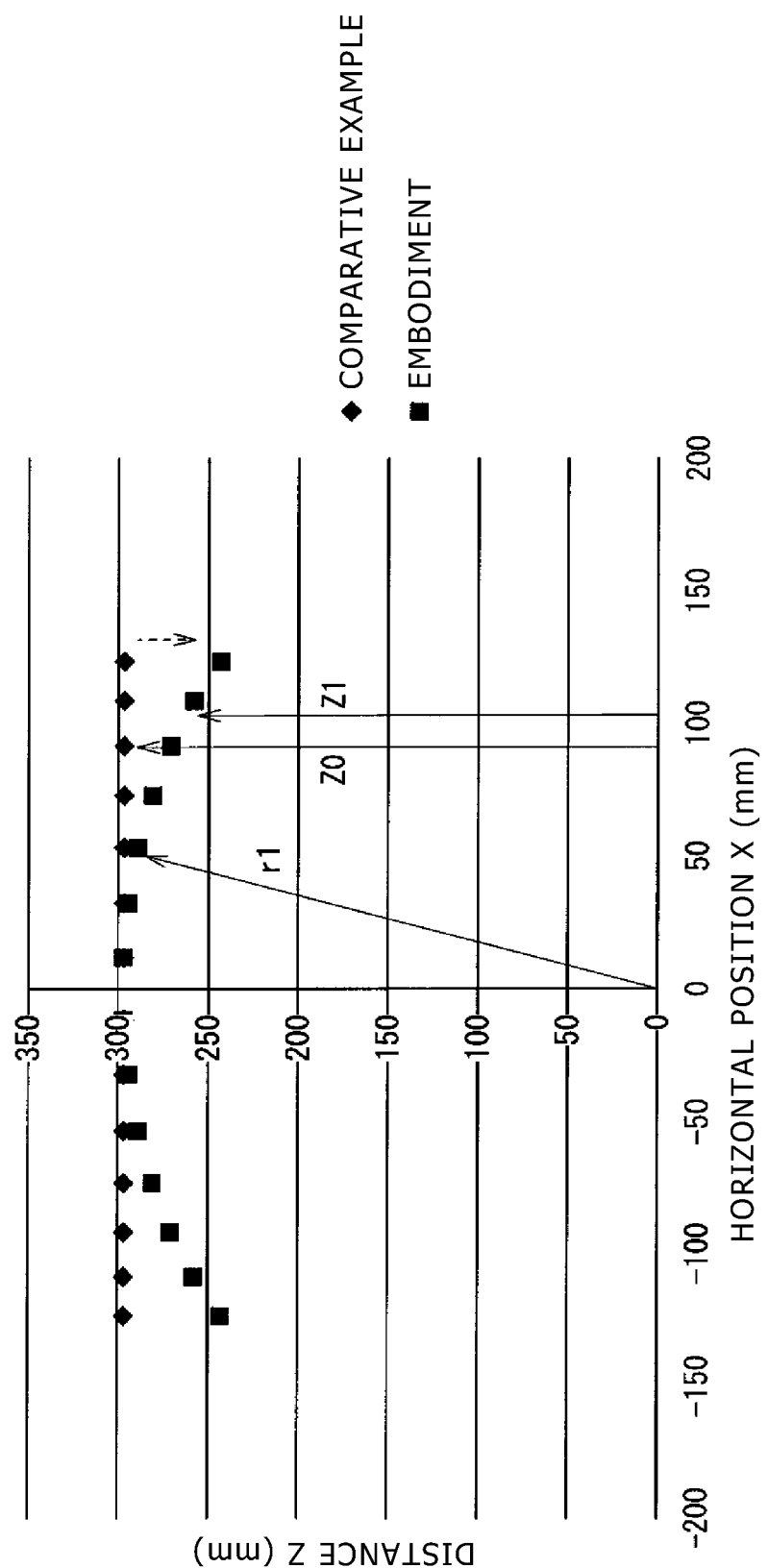
FIG. 6 is a diagrammatic view illustrating a relationship between an observation distance and a displayed position of a viewpoint image.
Figure 7:
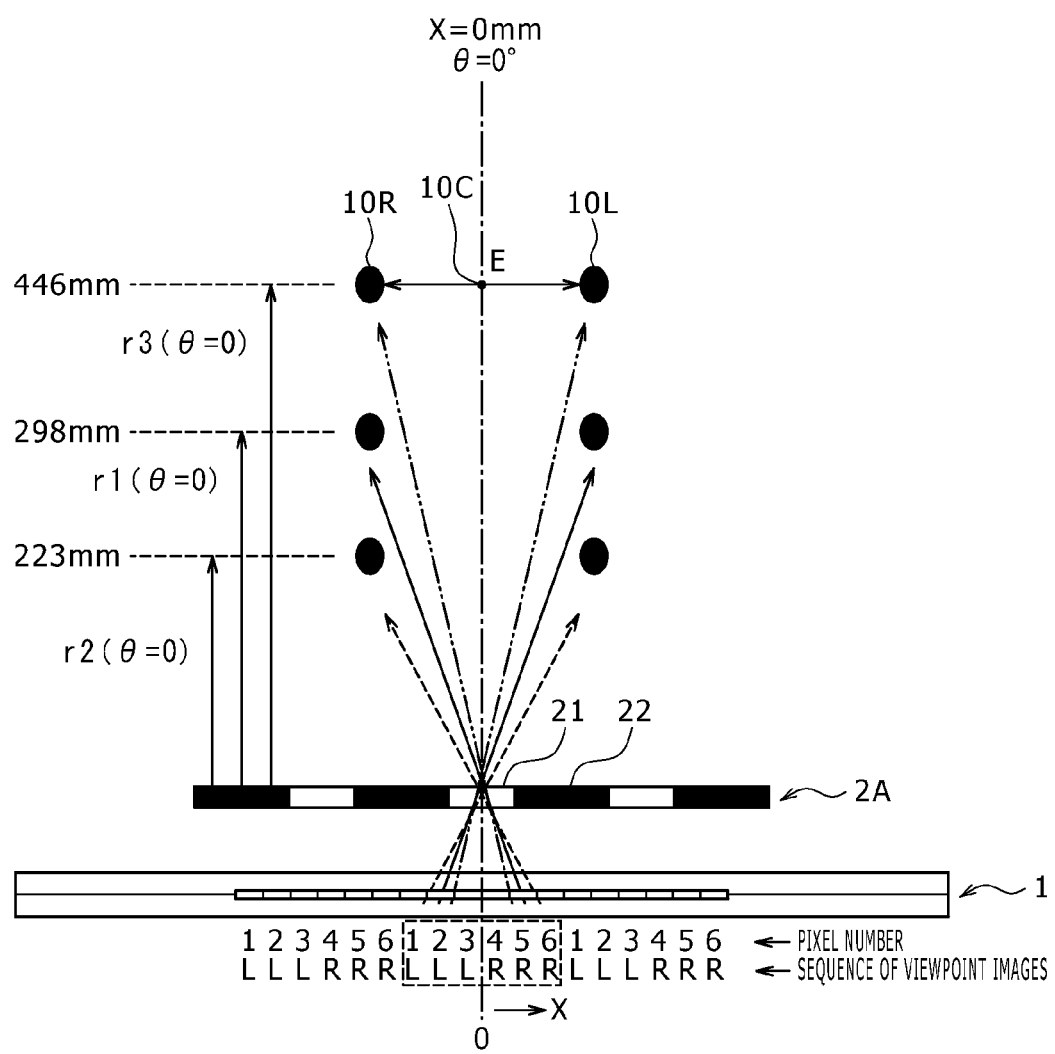
FIG. 7 is a diagrammatic view illustrating a difference of observed pixels which depends upon an observation distance.
Figure 8:
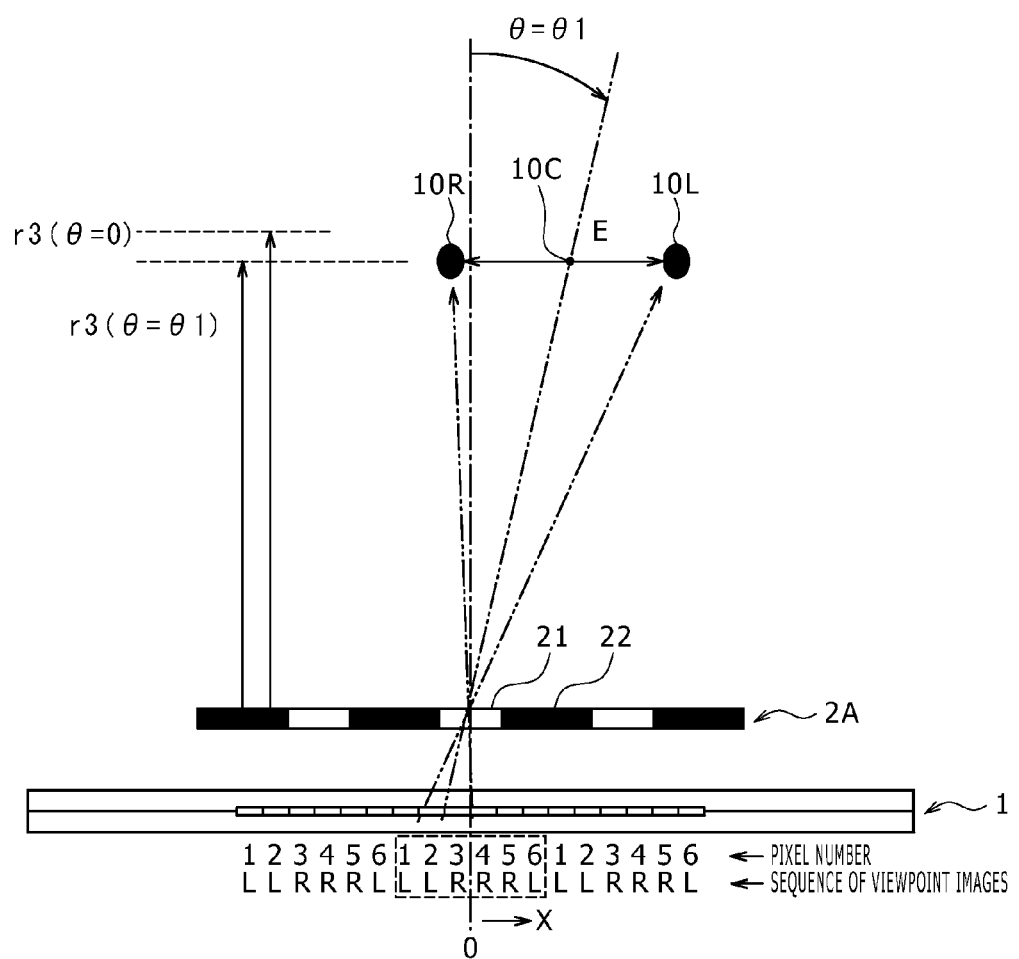
FIG. 8 is a diagrammatic view illustrating a difference of observed pixels which depends upon an observation angle.

A particular example wherein n is n=6 and first to sixth pixels are controlled as one display control unit is described with reference to FIGS. 5 to 9C. FIGS. 5 to 9C particularly illustrate display states principally at a central portion of the screen. In FIGS. 7 and 9A to 9C, display states at a central portion of the screen in the case where the observation angle θ is θ=0° are illustrated. In FIG. 8, a display state at a central portion of the screen in the case where the observation angle θ is θ=θ1 is illustrated. In FIGS. 7 and 8, the parallax barrier 2A is used as the parallax element 2. In FIGS. 5 to 8, the coordinate of a central portion of the display section 1 or the parallax element 2 in the horizontal X direction is represented by 0. The observation angle θ is an angle of the horizontal X direction of the observer with respect to the central portion of the parallax element 2. More particularly, as shown in FIGS. 7 and 8, the observation angle θ is an angle of a middle viewpoint position 10C between the left eye 10L and the right eye 10R with respect to a central portion of the parallax element 2. In FIGS. 5 and 6, the axis of abscissa indicates the position of the parallax element 2 in the horizontal X direction and the axis of ordinate indicates the distance Z from the surface of the parallax element 2 to the observer, namely, to the middle viewpoint position 10C. Reference symbols r1, r2 and r3 denote observation distances from the central portion of the parallax element 2, at which X=0, to the middle viewpoint position 10C.

The display controlling section 4 allocates, in the central portion of the screen of the display section 1, the same left eye viewpoint image L successively to the first to third pixels disposed at successive positions and controls the first to third pixels to display the left eye viewpoint image L, for example, as illustrated in FIG. 7. Further, the display controlling section 4 allocates the same right eye viewpoint image R successively to the fourth to sixth pixels disposed at successive positions and controls the fourth to sixth pixels to display the right eye viewpoint image R. In the following description, such a display state of viewpoint images as just described is referred to as "LLLRRR."

Example of a Variation of the Display State of Viewpoint Images Based on the Observation Angle θ

FIG. 5 illustrates a variation of the display state of viewpoint images based on the observation angle θ. As seen in FIG. 5, the display controlling section 4 successively shifts a sequence of viewpoint images to be displayed by the first to sixth pixels in such a manner that, within the angular range of θ=θ0 including θ=0°, the display state is "LLLRRR;" within the angular range of θ=θ1, the display state is "LLRRRL;" within the angular range of θ=θ2, the display state is "LRRRLL;" and within the angular range of θ=θ3, the display state is "RRRLLL" as the observation angle θ is increased. In FIG. 8, a display state of viewpoint images and a manner of observed pixels in the case where the observation angle θ is θ=θ1 are illustrated.

Example of a Variation of the Display State of Viewpoint Images Based on the Observation Distance As can be recognized also from FIG. 5, at the same observation angle θ, the display controlling section 4 does not vary the display positions of the viewpoint images including the left eye viewpoint image L and the right eye viewpoint image R on the display section 1. The display controlling section 4 causes the same viewpoint image to be displayed at two or more pixels disposed at successive positions so that the left eye viewpoint image L and the right eye viewpoint image R are observed at different pixel distances. In particular, the display controlling section 4 controls so that the left eye viewpoint image L and the right eye viewpoint image R are observed, at a second distance r2, namely, at a short distance, nearer to the parallax element 2 than a first distance r1, namely, a middle distance, from the central portion, at which X=0, of the parallax element 2, such that they are spaced away from each other by a greater pixel distance than the pixel distance between the left eye viewpoint image L and the right eye viewpoint image R which is observed at the first distance r1. Further, the display controlling section 4 controls so that, at a third distance r3, namely, at a long distance, farther from the parallax element 2 than the first distance r1, the left eye viewpoint image L and the right eye viewpoint image R are observed at a smaller pixel distance.

In particular, if the case of the observation angle θ=0° as seen in FIGS. 7 and 9A to 9C is taken as an example, then at the first distance r1, namely, at the middle distance, the left eye viewpoint image L displayed at the second pixel is observed and the right eye viewpoint image R displayed at the fifth pixel is observed. In this instance, the left eye viewpoint image L and the right eye viewpoint image R are observed such that they are spaced by a two-pixel distance from each other as seen from FIG. 9B. Consequently, the width of three pixels corresponds to the interocular distance E, or in other words, the width of one pixel corresponds to ⅓ the interocular distance E.

Figure 9A:
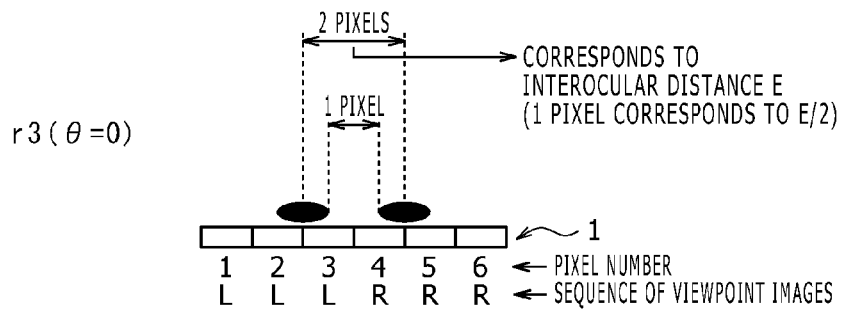
FIGS. 9A to 9C are diagrammatic views illustrating a difference of observed pixels which depends upon the observation distance in the case where the same viewpoint image is displayed at three pixels.
Figure 9B:
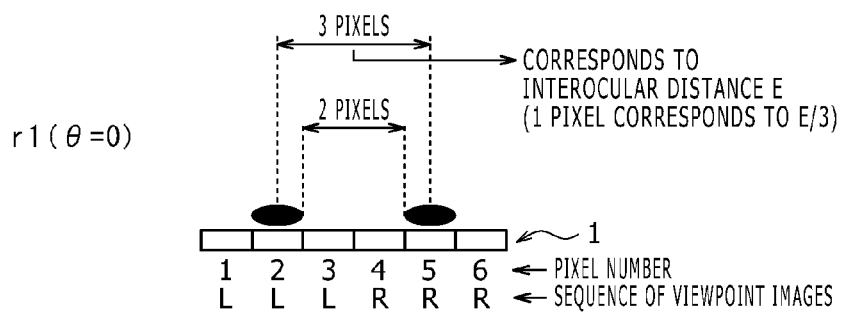

Even if the observation angle θ varies, the distance between observed pixels is equal to that in FIG. 9B as long as the viewpoint position remains at any plotted position of the first distance r1 shown in FIG. 5. For example, if the observation angle θ varies while the distance Z from the surface of the parallax element 2 remains a predetermined distance Z0 as seen from plotted points of a comparative example of FIG. 6, then the distance between observed pixels varies. When the observation angle θ varies, the distance between observed pixels becomes equal at a position of a distance Z1 at which the distance Z from the surface of the parallax element 2 is smaller than the predetermined distance Z0 as seen from plotted points of the embodiment of FIG. 6.

Figure 9C:
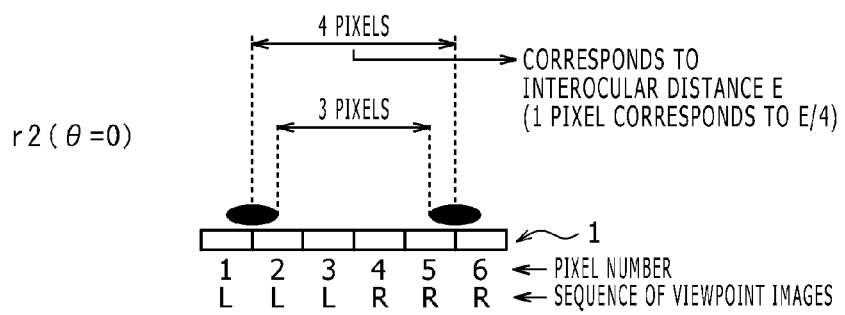

At the second distance r2 which is the short distance, the left eye viewpoint image L is observed such that it is centered at a middle portion between the first and second pixels while the right eye viewpoint image R is observed such that it is centered at a middle portion between the fifth and sixth pixels. In this instance, the left eye viewpoint image L and the right eye viewpoint image R are observed such that they are spaced away from each other by a distance equal to three pixels as seen in FIG. 9C, and the width of four pixels corresponds to the interocular distance E. In other words, the width of one pixel corresponds to ¼ the interocular distance E. Even if the observation angle θ varies, the distance between observed pixels remains equal to that in FIG. 9C as long as the viewpoint position remains at any plotted position of the second distance r2 shown in FIG. 5.

At the third distance r3 which is the long distance, the left eye viewpoint image L is observed such that it is centered at a middle portion between the second and third pixels while the right eye viewpoint image R is observed such that it is centered at a middle portion between the fourth and fifth pixels. In this instance, the left eye viewpoint image L and the right eye viewpoint image R are observed such that they are spaced away from each other by a distance equal to one pixel as seen in FIG. 9A, and the width of two pixels corresponds to the interocular distance E. In other words, the width of one pixel corresponds to ½ the interocular distance E. Even if the observation angle θ varies, the distance between observed pixels remains equal to that in FIG. 9A as long as the viewpoint position remains at any plotted position of the third distance r3 shown in FIG. 5.

Display Example in the Case Where n=4

Figure 10A:
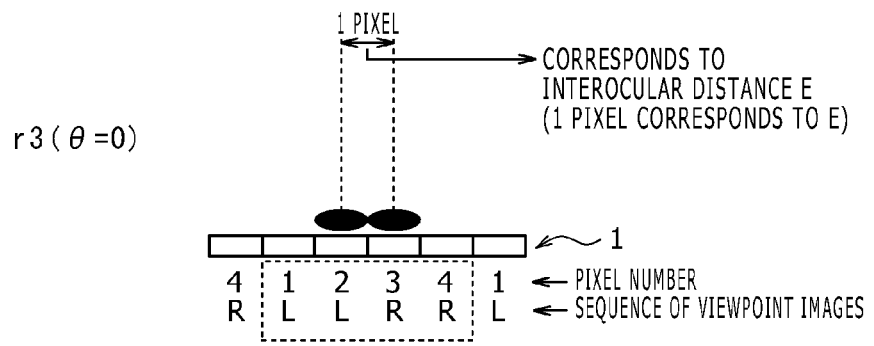
FIGS. 10A to 10C are diagrammatic views illustrating a difference of observed pixels which depends upon the observation distance in the case where the same viewpoint image is displayed at two pixels.
Figure 10B:
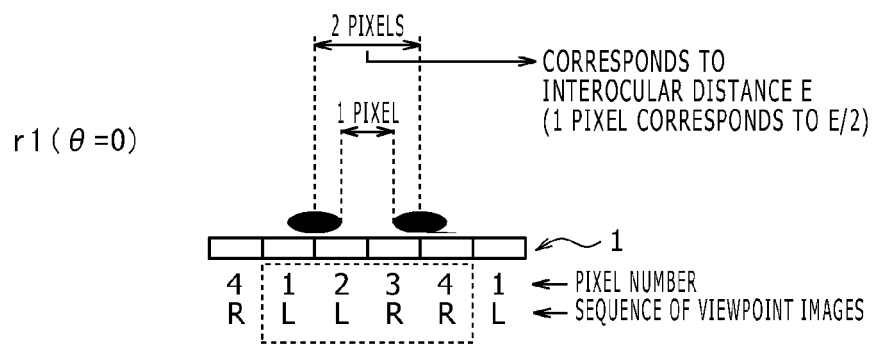
Figure 10C:
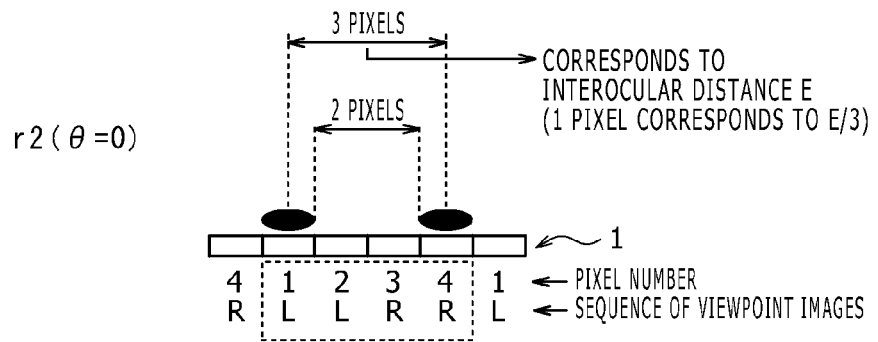

It is to be noted that, while FIGS. 5 to 9C illustrate a particular example, in the case where n is n=6 and the first to sixth pixels are controlled as one display control unit, the unit pixel number n may be equal to or smaller than n=6. FIGS. 10A to 10C illustrate a particular example wherein n is n=4 and first to fourth pixels are controlled as one display control unit. Further, FIGS. 10A to 10C illustrate display states at a central portion of the screen, similarly to FIGS. 9A to 9C. In addition, FIGS. 10A to 10C illustrate a state in which the observation angle θ is θ=0°. In the case where n=4, the display controlling section 4 allocates, in a central portion of the screen of the display section 1, the same left eye viewpoint image L successively to the first and second pixels disposed at successive positions and controls the first and second pixels to display the left eye viewpoint image L, for example, as illustrated in FIG. 10A. Further, the display controlling section 4 allocates the same right eye viewpoint image R successively to the third and fourth pixels disposed at successive positions and controls the third and fourth pixels to display the right eye viewpoint image R.

In the case where n=4, at the first distance r1, namely, at the middle distance, the left eye viewpoint image L is observed such that it is centered at a middle portion between the first and second pixels and the right eye viewpoint image R is observed such that it is centered at a middle portion between the third and fourth pixels. In this instance, the left eye viewpoint image L and the right eye viewpoint image R are observed such that they are spaced away from each other by a distance of one pixel as seen in FIG. 10B, and the width of two pixels corresponds to the interocular distance E. In other words, the width of one pixel corresponds to ½ the interocular distance E.

At the second distance r2, namely, at the short distance, the left eye viewpoint image L displayed at the first pixel is observed and the right eye viewpoint image R displayed at the fourth pixel is observed. In this instance, the left eye viewpoint image L and the right eye viewpoint image R are observed in a spaced relationship from each other by a distance of three pixels as seen in FIG. 10C, and the width of three pixels corresponds to the interocular distance E. In other words, the width of one pixel corresponds to ⅓ the interocular distance E.

At the third distance r3, namely, at the long distance, the left eye viewpoint image L displayed at the second pixel is observed and the right eye viewpoint image R displayed at the third pixel is observed. In this instance, the width of one pixel corresponds to the interocular distance E as seen in FIG. 10A.

Changeover Margin of the Viewpoint Images at Observation Distances

Figure 11A:
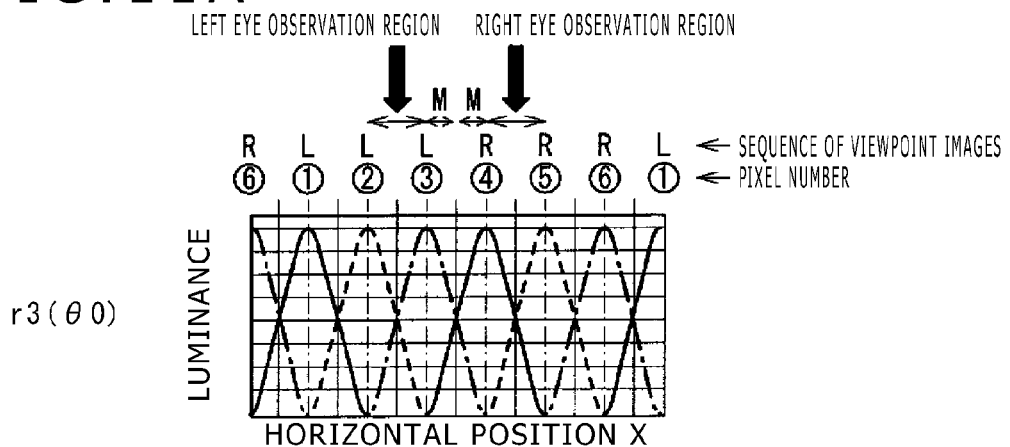
FIGS. 11A to 11C are diagrammatic views illustrating a difference of a changeover margin of a viewpoint image which depends upon the observation distance.
Figure 11B:
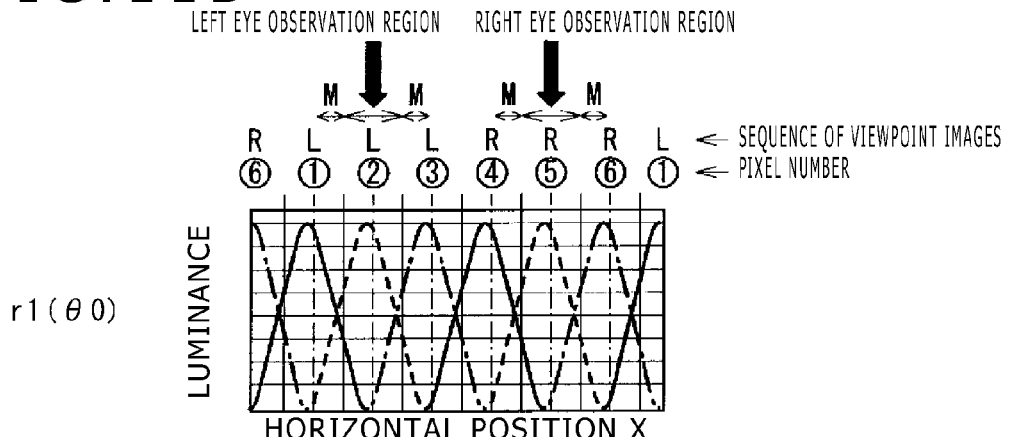
Figure 11C:
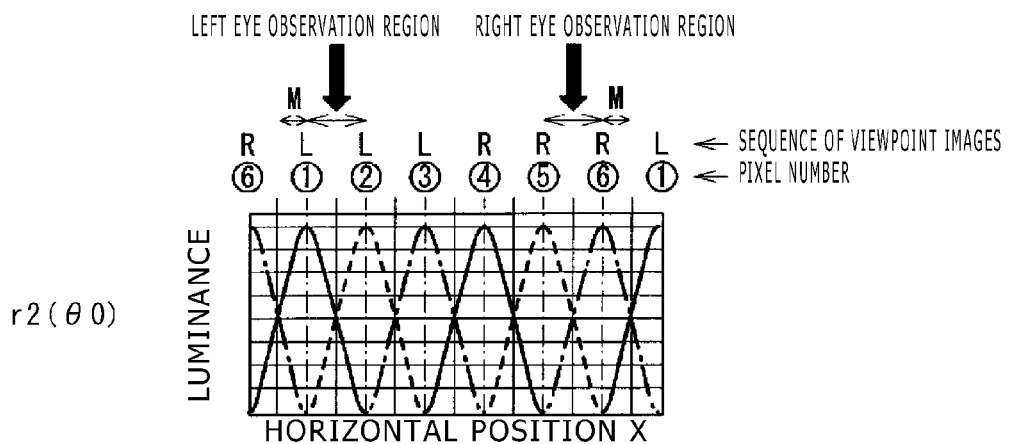

In the present display apparatus, the left eye viewpoint image L and the right eye viewpoint image R are observed at a pixel distance which differs depending upon the observation distance as described hereinabove with reference to FIGS. 9A to 10C. Therefore, the range within which normal stereoscopic viewing can be carried out when the viewpoint position moves in a horizontal direction differs depending upon the observation distance as seen in FIGS. 11A to 11C. FIGS. 11A to 11C illustrate a difference of the changeover margin M of the viewpoint image depending upon the observation distance. Referring to FIGS. 11A to 11C, if the left eye 10L and the right eye 10R move in a horizontal direction, within the range of the changeover margin M, normal stereoscopic viewing can be carried out. If the movement exceeds the range of the changeover margin M, then crosstalk wherein the left eye viewpoint image L and the right eye viewpoint image R are observed in a mixed fashion arises. If the range of the changeover margin M is exceeded, then the display state of the viewpoint image is changed over to that suitable for the observation angle θ as seen in FIG. 5. It is to be noted that FIG. 11A corresponds to a display state at the third distance r3, namely, at the long distance, similarly to FIG. 9A; FIG. 11B corresponds to the display state at the first distance r1, namely, at the middle distance, similarly to FIG. 9B; and FIG. 11C corresponds to the display state at the second distance r2, namely, at the short distance, similarly to FIG. 9C. In FIGS. 11A to 11C, the axis of abscissa indicates the position of the parallax element 2 in the horizontal X direction and the axis of ordinate indicates a distribution of the luminance of viewpoint images displayed by pixels.

FIG. 12 illustrates an example of calculation of the changeover margin M taking the observation region of the left eye 10L at the first distance r1, namely, at the middle distance, of FIG. 11B as an example. Referring to FIG. 12, reference character Wwz denotes a range in which the crosstalk amount is equal to or smaller than 3%. At the first distance r1, the width of three pixels corresponds to the interocular distance E as illustrated also in FIG. 9B, and the width of one pixel corresponds to ⅓ the interocular distance E. Therefore, if the interocular distance E is 65 mm and the range Wwz is 30 mm, then the changeover margin M is such as given below. Thus, if the viewpoint position exceeds the changeover margin M in the X2 direction, then the display state of the viewpoint image changes from "LLLRRR" to "LLRRRL" as seen in FIG. 12. On the other hand, if the viewpoint position exceeds the changeover margin M in the X1 direction, then the display state of the viewpoint image changes over from "LLLRRR" to "RLLLRR."

$$M=E/6+(Wwz/3)\cdot 1/2=65/6+(30/3)-1/2=15.8 \text{ mm}$$

It is to be noted that the changeover margin M at the third distance r3 of FIG. 11A and at the second distance r2 of FIG. 11C is such as given below.

$$M=(Wwz/3)\cdot 1/2=(30/3)\cdot 1/2=5 \text{ mm}$$

The foregoing is a particular example of the changeover margin M in the case where n is n=6 and first to sixth pixels are determined as one display control unit. However, also in the case of the display example of FIG. 10, namely in the case where n is n=4 and first to fourth pixels are determined as one display control unit, similar calculation can be applied.

Figure 13:
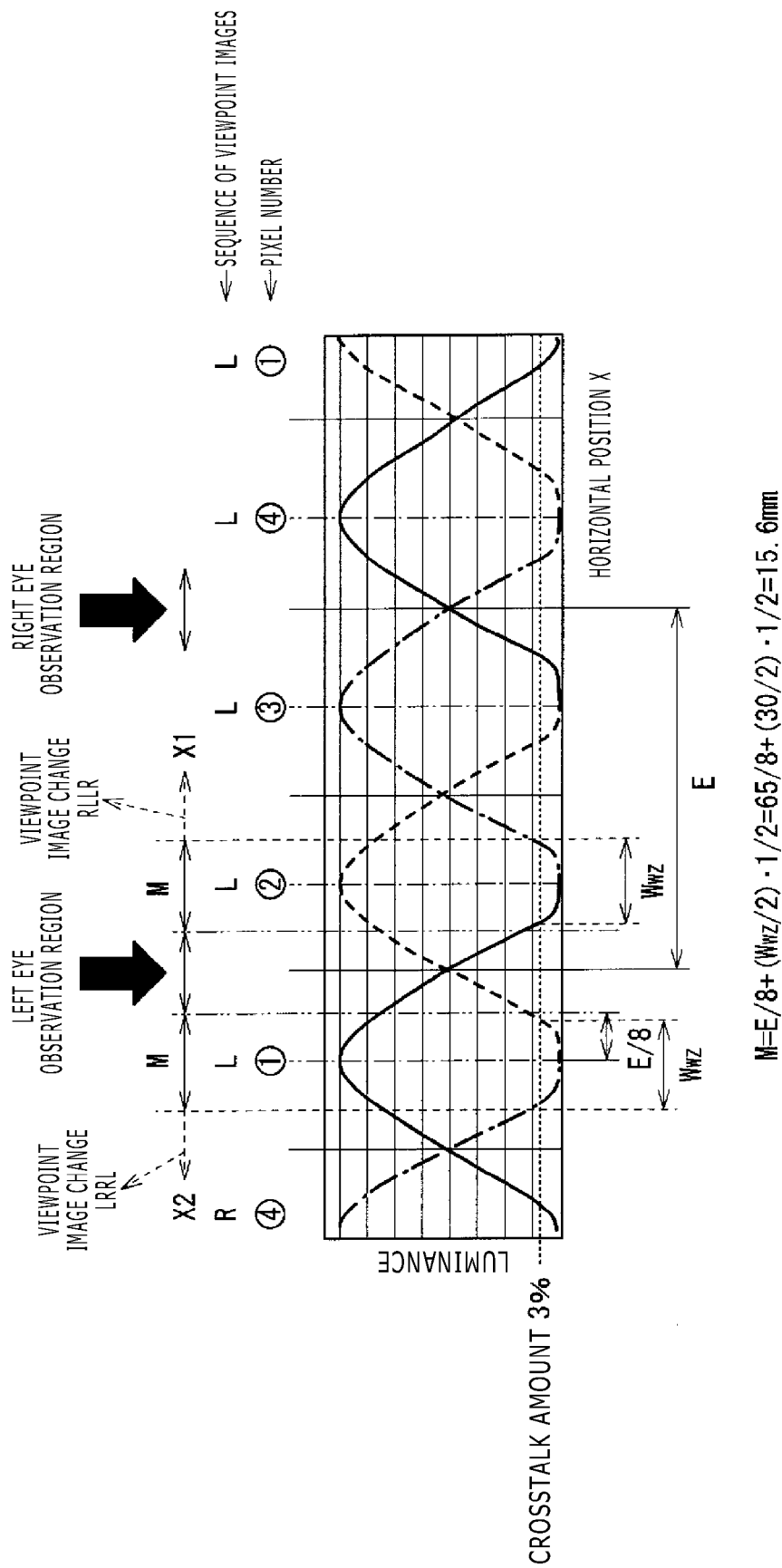
FIG. 13 is a diagrammatic view illustrating an example of a changeover margin in the case where the same viewpoint image is displayed at two pixels.

FIG. 13 illustrates an example of calculation of the changeover margin M corresponding to the display state of FIG. 10B. As illustrated also in FIG. 10B, the width of two pixels corresponds to the interocular distance E, and the width of one pixel corresponds to ½ the interocular distance E. Therefore, if the interocular distance E is 65 mm and the range Wwz is 30 mm, then the changeover margin M is such as given below. Thus, if the viewpoint position exceeds the changeover margin M in the X2 direction, then the display state of the viewpoint image changes from "LLRR" to "LRRL" as seen in FIG. 13. On the other hand, if the viewpoint position exceeds the changeover margin M in the X1 direction, then the display state of the viewpoint image changes over from "LLRR" to "RLLR."

$$M=E/8+(Wwz/2)\cdot\frac{1}{2}=65/8+(30/2)\cdot\frac{1}{2}=15.6 \text{ mm}$$

Accordingly, the changeover margin M is greater in the case of n=6 than in the case of n=4, and crosstalk is less likely to arise in the case of n=6.

3. Effect

As described above, according to the display apparatus of the present embodiment, the display position of viewpoint images at pixels is varied in response to the observation angle. Therefore, appropriate stereoscopic display can be carried out irrespective of the viewpoint position. Further, the same viewpoint image is displayed at two or more pixels disposed at successive positions. Therefore, as long as the observation angle $\theta$ exhibits no variation, even if the observation distance varies, stereoscopic display can be carried out appropriately although the observed pixel positions and the pixel distance vary.

4. Modification

The technology according to the present disclosure is not limited to the embodiment described above but can be carried out in variously modified forms.

Figure 14:
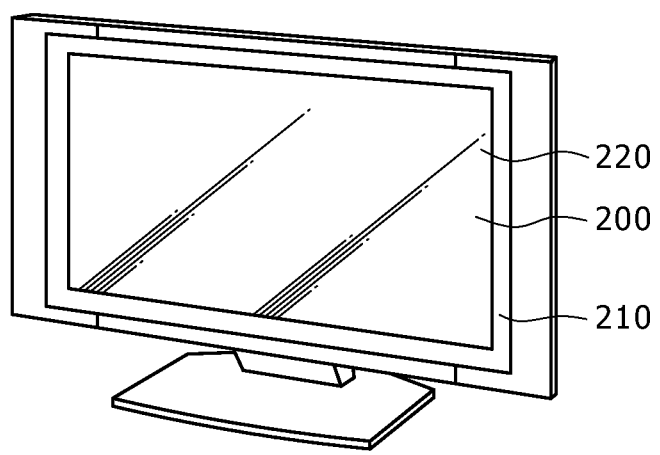
FIG. 14 is a schematic view showing an appearance of an example of an electronic apparatus.

For example, the display apparatus according to the embodiment can be applied to various electronic apparatus which have a displaying function. FIG. 14 shows an appearance configuration of a television apparatus as an example of such an electronic apparatus. The television apparatus shown includes a front panel 210 and an image displaying screen section 200 including a glass filter 220.

Further, the present technology can have, for example, such configurations as described below.

(1)
A display apparatus including:
a display section configured to have a plurality of pixels and display a plurality of viewpoint images allocated to different ones of the pixels;
a detection section configured to detect an observation angle of an observer; and
a display controlling section configured to change displaying positions of the viewpoint images at the pixels in response to the observation angle.

(2)
The display apparatus according to (1) above, wherein the display controlling section controls such that the same viewpoint image is displayed at two or more ones of the pixels which are disposed at successive positions.

(3)
The display apparatus according to (1) or (2) above, further including
a parallax element configured to separate the plurality of viewpoint images displayed on the display section to different directions from each other.

(4)
The display apparatus according to (3) above, wherein the plurality of viewpoint images include a left eye viewpoint image and a right eye viewpoint image, and
the display controlling section controls such that, where n is an integer equal to or greater than 4, n ones of the pixels which are disposed at successive positions display n/2 left eye viewpoint images and n/2 right eye viewpoint images and the displaying positions of the n/2 left eye viewpoint images and the n/2 right eye viewpoint images in the n pixels are changed in response to the observation angle.

(5)
The display apparatus according to (3) or (4) above,
wherein the plurality of viewpoint images include a left eye viewpoint image and a right eye viewpoint image, and
the display controlling section controls such that the same viewpoint image is displayed at two or more pixels which are disposed at successive positions and, at the same observation angle, the displaying positions of the left eye viewpoint image and the right eye viewpoint image on the display section are not varied whereas the left eye viewpoint image and the right eye viewpoint image are observed at different pixel distances in response to the observation distance.

(6)
The display apparatus according to (5) above, wherein the display controlling section controls so that the left eye viewpoint image and the right eye viewpoint image are observed, at a second distance nearer to the parallax element than a first distance from a predetermined portion of the parallax element, such that the left eye viewpoint image and the right eye viewpoint image are spaced away from each other by a greater pixel distance than the pixel distance between the left eye viewpoint image and the right eye viewpoint image which is observed at the first distance, and further controls so that, at a third distance farther from the parallax element than the first distance, the left eye viewpoint image and the right eye viewpoint image are observed in a spaced relationship from each other by a smaller pixel distance.

(7)
The display apparatus according to any one of (3) to (6) above, wherein the observation angle is an angle in a horizontal direction of the observer with respect to a predetermined portion of the parallax element.

(8)
An electronic apparatus which includes a display apparatus, the display apparatus including:
a display section configured to have a plurality of pixels and display a plurality of viewpoint images allocated to different ones of the pixels;
a detection section configured to detect an observation angle of an observer; and
a display controlling section configured to change displaying positions of the viewpoint images at the pixels in response to the observation angle.

The present disclosure contains subject matter related to that disclosed in Japanese Priority Patent Application JP 2012-049964 filed in the Japan Patent Office on Mar. 7, 2012, the entire content of which is hereby incorporated by reference.

What is claimed is:
1. A display apparatus comprising:
a display section configured to have a plurality of pixels and display a plurality of viewpoint images allocated to different ones of the pixels;
a detection section configured to detect an observation angle of an observer; and a display controlling section configured to change displaying positions of the viewpoint images at the pixels in response to the observation angle; and a parallax element configured to separate the plurality of viewpoint images displayed on the display section to respectively different directions, wherein the plurality of viewpoint images include a left eye viewpoint image and a right eye viewpoint image, the display controlling section performs control such that a same viewpoint image is displayed at two or more pixels which are disposed at successive positions and, at a same observation angle, the displaying positions of the left eye viewpoint image and the right eye viewpoint image on the display section are not varied whereas the left eye viewpoint image and the right eye viewpoint image are observed at different pixel distances in response to the observation distance, and the display controlling section performs control so that the left eye viewpoint image and the right eye viewpoint image are observed, at a second distance nearer to the parallax element than a first distance from a predetermined portion of the parallax element, such that the left eye viewpoint image and the right eye viewpoint image are spaced away from each other by a greater pixel distance than the pixel distance between the left eye viewpoint image and the right eye viewpoint image that is observed at the first distance, and further performs control so that, at a third distance farther from the parallax element than the first distance, the left eye viewpoint image and the right eye viewpoint image are observed in a spaced relationship from each other by a smaller pixel distance.

2. The display apparatus according to claim 1, wherein the display controlling section controls such that, where n is an integer equal to or greater than 4, n ones of the pixels which are disposed at successive positions display n/2 left eye viewpoint images and n/2 right eye viewpoint images and the displaying positions of the n/2 left eye viewpoint images and the n/2 right eye viewpoint images in the n pixels are changed in response to the observation angle.

3. The display apparatus according to claim 1, wherein the observation angle is an angle in a horizontal direction of the observer with respect to a predetermined portion of the parallax element.

4. An electronic apparatus which includes a display apparatus, the display apparatus comprising:

a display section configured to have a plurality of pixels and display a plurality of viewpoint images allocated to different ones of the pixels;

a detection section configured to detect an observation angle of an observer; and a display controlling section configured to change displaying positions of the viewpoint images at the pixels in response to the observation angle;

a parallax element configured to separate the plurality of viewpoint images displayed on the display section to respectively different directions, wherein the plurality of viewpoint images include a left eye viewpoint image and a right eye viewpoint image, the display controlling section performs control such that a same viewpoint image is displayed at two or more pixels which are disposed at successive positions and, at a same observation angle, the displaying positions of the left eye viewpoint image and the right eye viewpoint image on the display section are not varied whereas the left eye viewpoint image and the right eye viewpoint image are observed at different pixel distances in response to the observation distance, and the display controlling section performs control so that the left eye viewpoint image and the right eye viewpoint image are observed, at a second distance nearer to the parallax element than a first distance from a predetermined portion of the parallax element, such that the left eye viewpoint image and the right eye viewpoint image are spaced away from each other by a greater pixel distance than the pixel distance between the left eye viewpoint image and the right eye viewpoint image that is observed at the first distance, and further performs control so that, at a third distance farther from the parallax element than the first distance, the left eye viewpoint image and the right eye viewpoint image are observed in a spaced relationship from each other by a smaller pixel distance.

5. The electronic apparatus according to claim 4, wherein the display controlling section controls such that, where n is an integer equal to or greater than 4, n ones of the pixels which are disposed at successive positions display n/2 left eye viewpoint images and n/2 right eye viewpoint images and the displaying positions of the n/2 left eye viewpoint images and the n/2 right eye viewpoint images in the n pixels are changed in response to the observation angle.

6. The electronic apparatus according to claim 4, wherein the observation angle is an angle in a horizontal direction of the observer with respect to a predetermined portion of the parallax element.

* * * * *